US012753882B2

(12) United States Patent
Guilloteau

(10) Patent No.: US 12,753,882 B2
(45) Date of Patent: Oct. 6, 2026

(54) TANK, IN PARTICULAR FOR A LIQUID HYDROGEN RESERVOIR, PROVIDED WITH AT LEAST ONE DOME FIXED BY WAY OF AN OUTER WELDED JOINT

(71) Applicant: Airbus Operations SAS, Toulouse (FR)

(72) Inventor: Damien Guilloteau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 218 days.

(21) Appl. No.: 18/802,811

(22) Filed: Aug. 13, 2024

(65) Prior Publication Data

US 2024/0401742 A1 Dec. 5, 2024

Related U.S. Application Data

(62) Division of application No. 17/872,334, filed on Jul. 25, 2022, now abandoned.

(30) Foreign Application Priority Data

Jul. 29, 2021 (FR) ...................................... 2108275

(51) Int. Cl.
*B23P 6/00* (2006.01)
*B23K 20/12* (2006.01)
(Continued)

(52) U.S. Cl.
CPC .............. *F17C 1/14* (2013.01); *B23K 20/122* (2013.01); *B23P 6/00* (2013.01); *B23K 2101/12* (2018.08);
(Continued)

(58) Field of Classification Search
CPC ................. B23P 6/00; Y10T 29/49721; Y10T 29/49726; Y10T 29/49728;
(Continued)

(56) References Cited

U.S. PATENT DOCUMENTS 2,186,185 A * 1/1940 Walker .................. B65D 90/00 52/247
3,029,981 A 4/1962 Webster et al.
(Continued)

FOREIGN PATENT DOCUMENTS

CA 2105987 A1 9/1992
EP 0575395 B1 8/1995
(Continued)

OTHER PUBLICATIONS

French Search Report dated Apr. 5, 2022 for Application No. FR 2108275. 2 p. (see p. 1, categorizing the cited references).

*Primary Examiner* — Jermie E Cozart
(74) *Attorney, Agent, or Firm* — Lerner David LLP

(57) ABSTRACT

A tank, in particular for a liquid hydrogen reservoir, provided with at least one dome fixed by way of an outer welded joint and having a central portion provided with at least one free end including a first connecting element and at least one dome provided with an open end including a second connecting element, the dome and the central portion being able to be joined together, the first connecting element and the second connecting element being configured to form, when the central portion and the dome are joined together, a protruding tab extending toward the outside of the tank and able to be welded to a protruding end, such a protruding tab making it possible in particular to join together the tank, this being done entirely from the outside of said tank, and to easily mount and dismount the dome, in particular without accessibility issues.

6 Claims, 5 Drawing Sheets

(51) Int. Cl.

| | |
|---|---|
| ***F17C 1/14*** | (2006.01) |
| *B23K 101/12* | (2006.01) |
| *B23K 103/10* | (2006.01) |

(52) U.S. Cl.
CPC .. *B23K 2103/10* (2018.08); *F17C 2201/0109* (2013.01); *F17C 2203/0629* (2013.01); *F17C 2203/0639* (2013.01); *F17C 2203/0646* (2013.01); *F17C 2209/2181* (2013.01); *F17C 2209/221* (2013.01); *F17C 2209/222* (2013.01); *F17C 2221/012* (2013.01); *F17C 2223/0153* (2013.01); *Y10T 29/49721* (2015.01); *Y10T 29/49726* (2015.01); *Y10T 29/49728* (2015.01); *Y10T 29/49737* (2015.01); *Y10T 29/49742* (2015.01); *Y10T 29/49821* (2015.01)

(58) Field of Classification Search
CPC ......... Y10T 29/49737; Y10T 29/49742; Y10T 29/49821; F17C 223/0153; F17C 2209/221; F17C 2221/012
See application file for complete search history.

(56) References Cited

U.S. PATENT DOCUMENTS

| | | | | | |
|---|---|---|---|---|---|
| 3,269,585 | A * | 8/1966 | Christensen | ............. | F16J 13/02 220/378 |
| 3,332,573 | A * | 7/1967 | Romanos | ................. | F16J 13/02 220/327 |
| 2004/0007186 | A1 | 1/2004 | Saito | | |
| 2006/0243746 | A1 | 11/2006 | Osborne et al. | | |
| 2012/0006820 | A1 | 1/2012 | Lind et al. | | |
| 2012/0255155 | A1 | 10/2012 | Lind et al. | | |
| 2020/0088351 | A1 | 3/2020 | Watanabe et al. | | |

FOREIGN PATENT DOCUMENTS

| | | | | |
|---|---|---|---|---|
| FR | 2492050 | A * | 4/1982 | ............. B21D 51/24 |
| GB | 751049 | A | 6/1956 | |
| JP | 2010111036 | A | 5/2010 | |
| JP | 2010112413 | A | 5/2010 | |

* cited by examiner

TANK, IN PARTICULAR FOR A LIQUID HYDROGEN RESERVOIR, PROVIDED WITH AT LEAST ONE DOME FIXED BY WAY OF AN OUTER WELDED JOINT

FIELD OF THE INVENTION

The present invention relates to a tank, in particular for a liquid hydrogen reservoir, provided with at least one dome. The invention also relates to a liquid hydrogen reservoir having such a tank.

BACKGROUND OF THE INVENTION

Since hydrogen is an environmentally acceptable fuel that does not emit greenhouse gases, developing its use and using it in the future in very varied fields and in particular in aircraft, in particular in transport airplanes, is envisaged.

The storage of hydrogen has a certain number of constraints, making the design of a reservoir complex. This is because hydrogen is gaseous at ambient temperature and pressure. This gaseous state is not ideal for storage since, as hydrogen has a low density, it entails provision of a reservoir with a very large volume in order to be able to contain a significant amount of hydrogen. Furthermore, since hydrogen is a component of very volatile nature, it must be stored in a completely sealed reservoir.

One solution for overcoming this problem consists in storing hydrogen in the liquid state by keeping it at very low temperature (approximately −252° C.) in a hermetically sealed container. To this end, a closed, entirely welded reservoir having refrigeration systems is usually used. Such a reservoir generally comprises in particular an inner tank having a shell with a convex dome welded by a butt weld, at each end of the shell.

However, a reservoir at very low temperature requires a tank equipped with complex systems and structures limiting access to said tank. As a matter of fact, as the tanks of such a reservoir are generally manufactured by welding a convex dome to each end of a shell, it is necessary to have access to these parts, on the one hand around the tank for the passage of welding tools and on the other hand to the inside of the tank for the passage of tools for holding in position.

BRIEF SUMMARY OF THE INVENTION

Aspects of the present invention propose a solution making it possible to overcome the above-mentioned drawback.

To that end, it relates to a tank, in particular for a liquid hydrogen reservoir, said tank having at least one central portion provided with at least one end referred to as free end, and at least one dome provided with an end referred to as open end, it being possible to join said dome and said central portion together.

According to an embodiment of the invention, the free end of the central portion comprises a first connecting element, the open end of the dome comprises, on an outer face of the dome, a second connecting element, and said first connecting element and said second connecting element are configured to form, when the central portion and the dome are joined together, a protruding tab extending toward the outside of the tank and able to be welded to a protruding end.

In this way, according to an aspect of the invention, what is provided is a tank which is able to be made with a welded join (between the central portion and the dome) and the part of which that is intended to be welded (specifically said protruding tab) is located on the outside of said tank, thus allowing the implementation of a join entirely realized from the outside of said tank, thereby making it possible to easily mount and dismount the dome, in particular without accessibility issues and without reducing the tank length, as mentioned below.

Moreover, advantageously, the protruding tab has a total length which is greater than a depth of a weld bead forming the weld joint of said tab.

In a preferred embodiment, the total length of the protruding tab is greater than or equal to twice and less than or equal to ten times the maximum length of a depth of a weld bead forming the weld joint of said protruding tab.

In this way, by cutting that part of the protruding tab on which the welding is done, it is possible to withdraw the dome and thus to open the tank, and the remaining (uncut) protruding tab is long enough to carry out a new welding operation, thereby allowing multiple successive mounting and dismounting operations in particular for accessing the inside of the tank, for example to carry out maintenance or repair operations, without reducing the tank length.

In a first embodiment, the first connecting element corresponds to an extension of the central portion, at the free end, the second connecting element corresponds to a longitudinal flange arranged on an outer face of the dome, and said extension and said longitudinal flange have cooperating shapes such that the longitudinal flange can be inserted with peripheral contact into said extension so as to form said protruding tab.

In a second embodiment, the first connecting element corresponds to a first flange arranged on an outer face of the central portion, the second connecting element corresponds to a second flange arranged on an outer face of the dome, and said first flange and said second flange have cooperating shapes such that a face of the first flange is able to bear against a face of the second flange so as to form said protruding tab.

Moreover, in one particular implementation of this second embodiment, the protruding tab, formed by the first flange and the second flange, has a bent shape.

Advantageously, at least one of said first and second connecting elements is a fitted piece.

Furthermore, on an inner face, the central portion comprises a shoulder, and a lateral face of the open end of the dome is configured to bear against the shoulder when the central portion and the dome are joined together.

In a preferred embodiment, the tank has two domes, the central portion is provided with two free ends, and one of said domes is fixed on one of said free ends and the other of said domes is fixed on the other of said free ends.

The present invention also relates to a reservoir for liquid hydrogen having at least one tank as described above.

Advantageously, the reservoir has two tanks as mentioned above, a first one of said tanks being a tank referred to as outer tank and the second one of said tanks being a tank referred to as inner tank, and the inner tank is arranged inside the outer tank.

The present invention relates, in addition, to a method for manufacturing a tank as described above or a liquid hydrogen reservoir as mentioned above.

According to an aspect of the invention, said manufacturing method has at least the following steps:

- a joining step, consisting in positioning an open end of a dome, provided with a first connecting element, on a free end of a central portion, provided with a second connecting element, such that said first and second connecting elements form a protruding tab, provided with a protruding end, and in keeping said dome and said central portion thus positioned in position in order to carry out a welding operation; and a welding step, consisting in welding said first and second connecting elements to one another at the protruding end by forming a weld bead having a depth which is less than a total length of the protruding tab.

The present invention moreover relates to a method for maintaining a tank as described above or a liquid hydrogen reservoir as mentioned above.

According to an aspect of the invention, said maintenance method has at least the following steps:

a cutting-out step, consisting in cutting out a part of a protruding tab having an initial length, said cut-out part corresponding at least to a welded protruding end of said protruding tab having a weld bead, and said cut-out part having a length which is greater than a depth of said weld bead; and a removing step, consisting in opening the tank having at least one dome and a central portion by separating at least said dome from said central portion, which are no longer fixed to one another, allowing access to the tank in order to carry out maintenance operations.

The maintenance method preferably moreover has a remounting step consisting in repositioning the dome on the central portion so as to reform the protruding tab, said protruding tab having a reduced length corresponding to its initial length minus the length of said cut-out part, and in welding the dome and the central portion to one another at the protruding end of said protruding tab by forming a weld bead having a depth which is less than the reduced length of the protruding tab.

BRIEF DESCRIPTION OF THE DRAWINGS

The appended figures will make it easy to understand how the invention may be implemented. In these figures, identical references denote similar elements.

DETAILED DESCRIPTION

Figure 1:
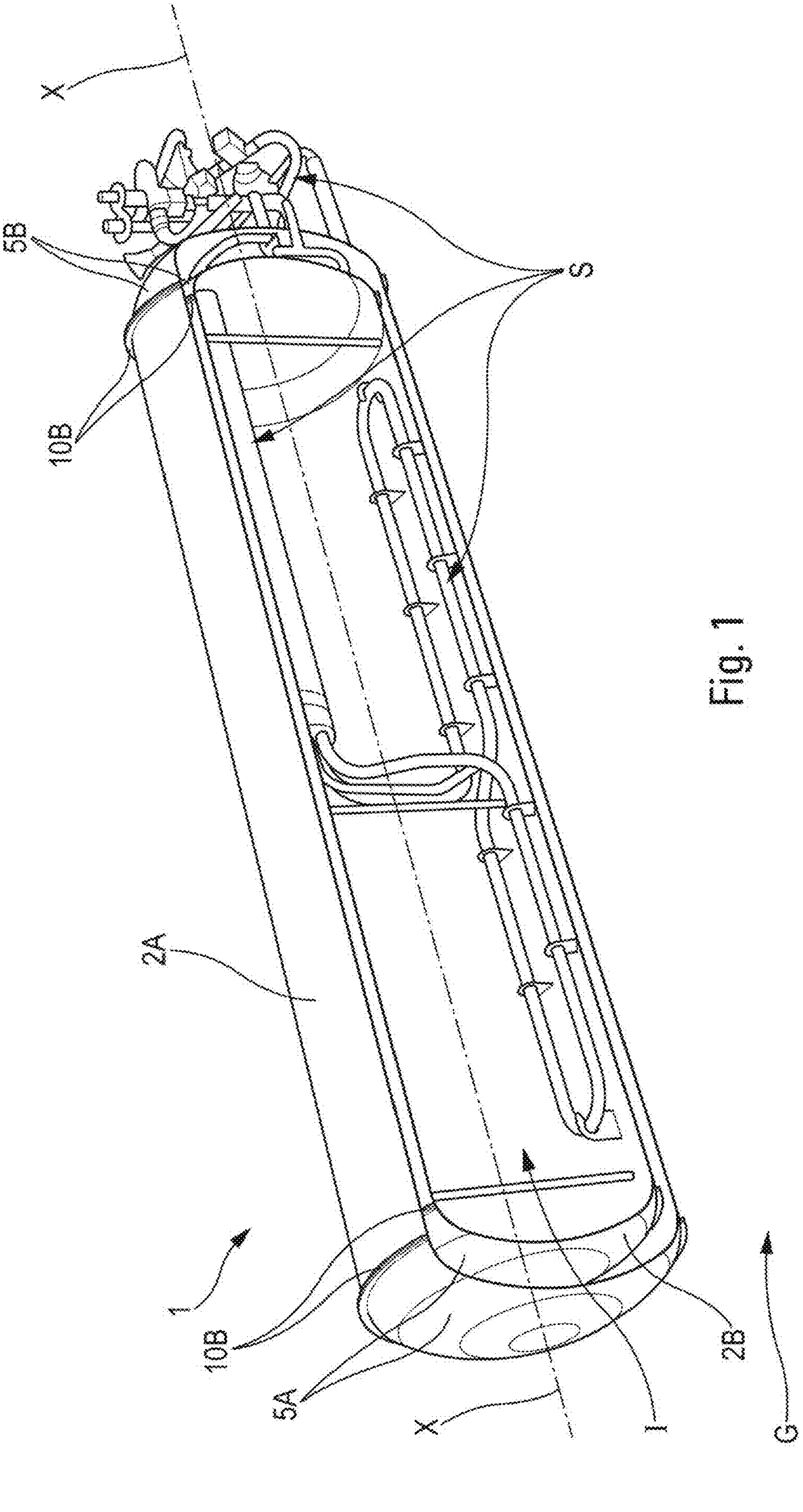
FIG. 1 is a perspective view, in partial section, of an example of a liquid hydrogen reservoir having an outer tank and an inner tank.

The reservoir 1, which makes it possible to illustrate the invention and is schematically shown in the particular embodiment of FIG. 1, is a reservoir for liquid hydrogen. In the example of FIG. 1, the reservoir 1, with a longitudinal axis X-X, has two tanks 2A and 2B, specifically an outer tank 2A and an inner tank 2B, which is arranged in the outer tank 2A. The reservoir 1 may also have an assembly of the usual systems S. These systems S are arranged at least partially inside the inner tank 2B and comprise ducts, sensors, a cold finger, etc. and in particular all of the usual elements necessary for generating the low temperatures required for storing liquid hydrogen.

Although not exclusively, a reservoir for liquid hydrogen such as the reservoir 1 is particularly well suited for equipping an at least partially hydrogen-powered vehicle. In a preferred way, the reservoir 1 is intended to equip an aircraft, in particular a transport airplane.

In the following description, a tank 2 of the reservoir 1 is described. This tank 2 may correspond to the inner tank 2A or to the outer tank 2B.

Figure 2:
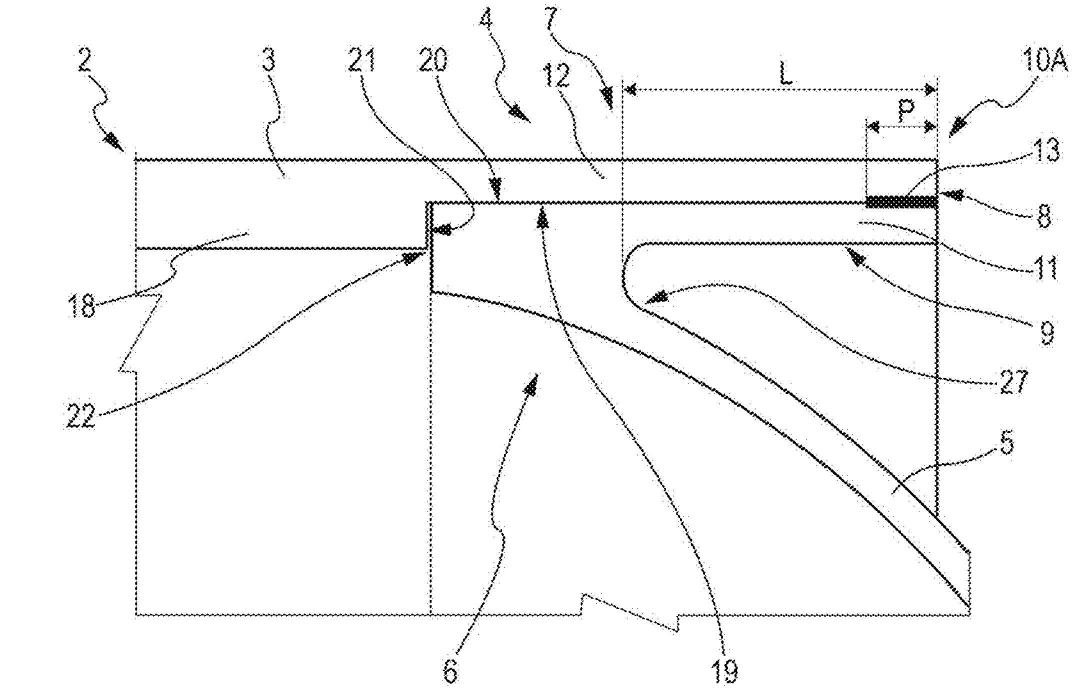
FIG. 2 is a partial view, in section, of an interface region between a central portion and a dome according to a first embodiment of a tank.
Figure 3:
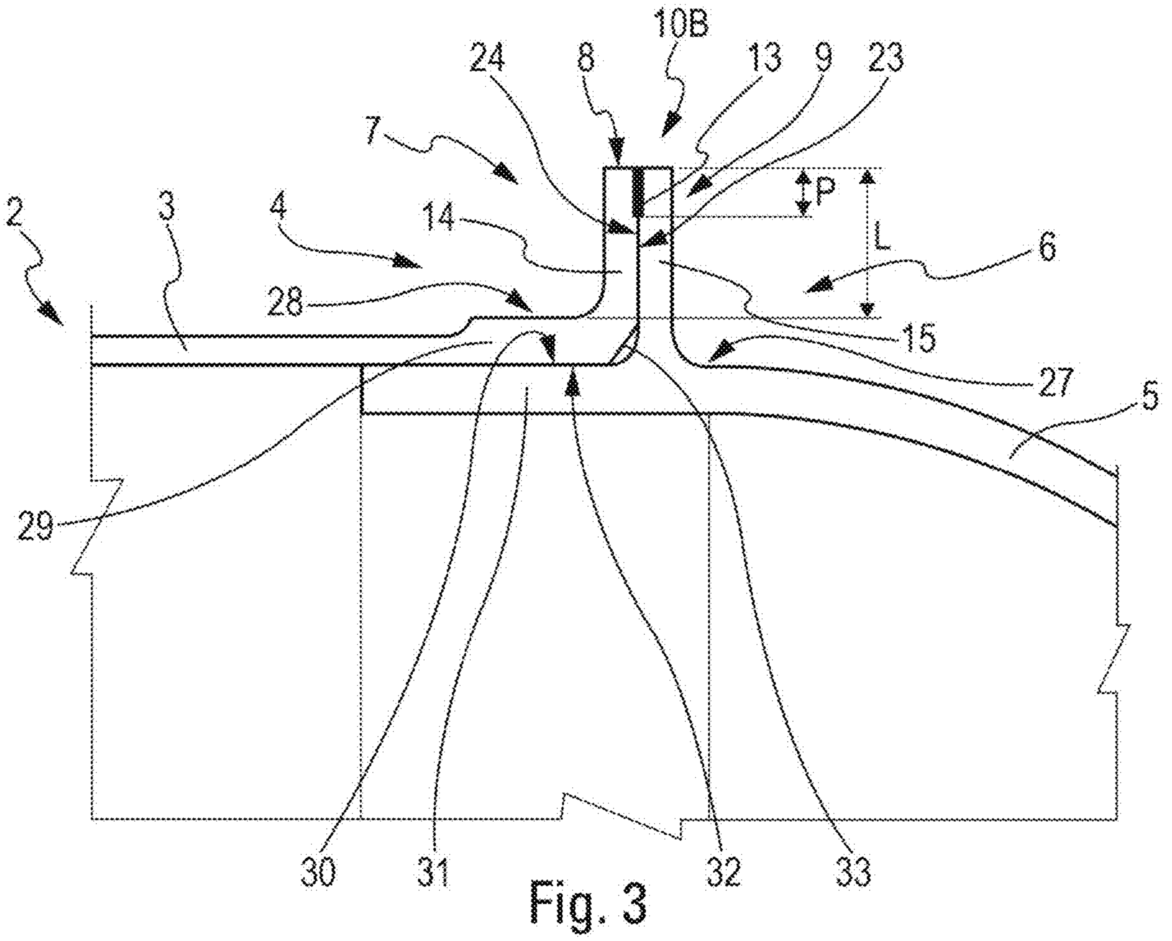
FIG. 3 is a partial view, in section, of an interface region between a central portion and a dome according to a second embodiment of a tank.
Figure 4:
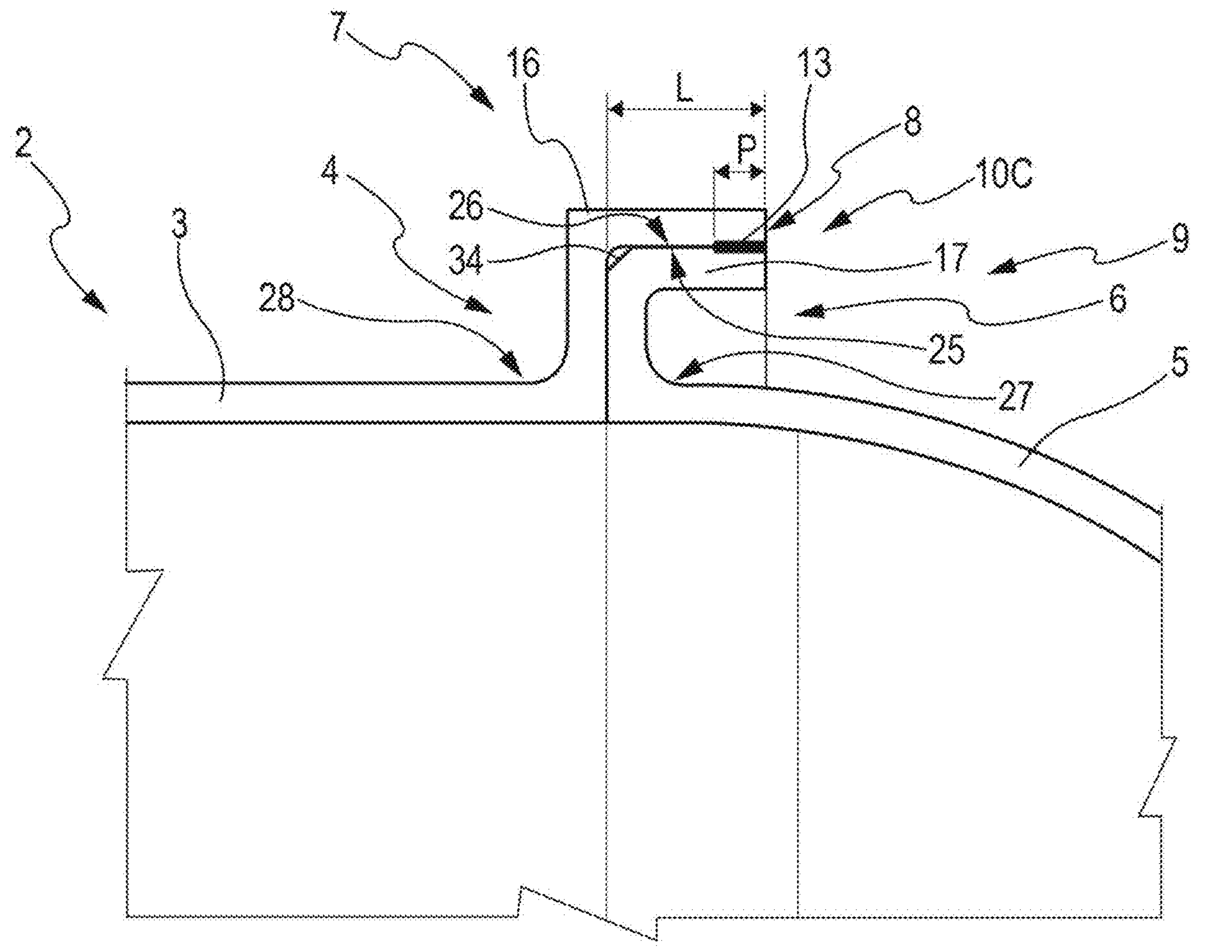
FIG. 4 is a partial view, in section, of a particular implementation of the second embodiment with a welded interface region between the central portion and the dome.

As is shown in FIGS. 2 to 4, which illustrate different embodiments, the tank 2 has a cylindrical central portion 3, representing a shell, with a longitudinal axis X-X, which is provided with at least one end 4 referred to as free end.

Within the scope of the present invention, the tank may comprise a central portion having shapes different from a cylindrical shape, for example a conical shape. The shape of the tank can, in particular, be adapted to the space available for the arrangement of the liquid hydrogen reservoir, in particular when the latter is intended to equip a vehicle, for example an aircraft.

Moreover, the tank 2 has a dome 5 able to be mounted on the free end 4 of the central portion 3 via an end 6 referred to as open end. The dome 5 is a hollow element having a casing open at one longitudinal end, specifically an end referred to as open end 6, and blind at the other longitudinal end (not shown). The dome 5 is preferably closed at its blind end by a convex bottom. Moreover, the central portion 3 and the dome 5 are able and intended to be joined together so as to form the tank 2, the open end 6 of said dome 5 being arranged on the free end 4 of the central portion 3.

In a particular embodiment, mentioned below, the two free ends 4 of the central portion 3 are each provided with a dome 5.

In the following description:

the terms "inner" and "inside" apply to the space surrounded and delimited by the walls of the tank 2, specifically the wall of the central portion 3 and that of the dome(s) 5, as is illustrated by an arrow I in FIG. 1; and the terms "outer" and "outside" apply to that which is outside this space surrounded by the walls of the tank 2, as is illustrated by an arrow G in FIG. 1.

As is shown in FIGS. 2 to 4, the free end 4 of the central portion 3 comprises a connecting element 7 and the open end 6 of the dome 5 comprises a connecting element 9. The connecting elements 7 and 9 are configured to form, when the dome 5 is arranged on the central portion 3, a protruding tab 10A, 10B, 10C located on the outside of the tank 2.

Moreover, the protruding tab 10A, 10B, 10C is able to be welded at an end referred to as protruding end 8, which corresponds to the free end of said protruding tab 10A, 10B, 10C. The weld joint of the protruding tab 10A, 10B, 10C, mentioned below, represents the fixed connection between the connecting elements 7 and 9, and more generally the fixed connection between the central portion 3 and the dome 5.

The weld joint of the protruding tab 10A, 10B, 10C is preferably the only fixed connection for keeping the central portion 3 and the dome 5 joined together. However, in particular embodiments, the central portion 3 and the dome 5 may have additional fixing systems, said systems complementing said weld joint. For example, it is possible to provide a removable fixing system which is intended to be arranged on the central portion 3 and the dome 5, in addition to said weld joint, and is able to contribute to the fixing between said central portion 3 and said dome 5.

In this way, what is provided is a tank 2 in which the weld joint between the central portion 3 and the dome 5, specifically the weld joint made on the protruding tab 10A, 10B, 10C, is located on the outside of the tank 2 when it is joined together, this exhibiting numerous advantages mentioned below.

The tank 2 (specifically in particular the central body 3 and the dome 5) may be made of various materials. In particular, it may be made of steel, composite material or aluminum. The tank 2 is preferably made of aluminum, which has the advantage of being a lightweight, strong and inexpensive material. Moreover, the mechanical properties of aluminum are not adversely affected at very low temperature.

Within the scope of the present invention, the protruding tab 10A, 10B, 10C may be made in various ways.

In a first embodiment, shown in FIG. 2, the connecting element 7 corresponds to an extension 12 of the central portion 3. This extension 12 corresponds to the extension of the structure of the central portion 3 along the longitudinal axis X-X, at the free end 4. In this first embodiment, since the central portion 3 is cylindrical, the extension 12 corresponds to a ring at the free end 4, having a cylindrical inner face 19.

Moreover, the connecting element 9 corresponds to a cylindrical longitudinal flange 11, arranged on the outer face 27 of the wall of the dome 5, at the open end 6. In this embodiment, the longitudinal flange 11 has symmetry of revolution, of axis X-X, and corresponds to a tubular portion extending from the open end 6 of the dome 5 toward the blind end (opposite end). The longitudinal flange 11 has, at the open end 6, a radial face 22 orthogonal to the longitudinal axis X-X.

The extension 12 and the longitudinal flange 11 have cooperating shapes.

Within the scope of the present invention, cooperating shapes are understood to mean different types of identical shapes, as mentioned below, allowing contact between two faces of the elements under consideration.

As is shown in FIG. 2, the diameter of the face 19 of the (cylindrical) longitudinal flange 11 is slightly smaller than the diameter of the face 20 (toward the outside) of the (cylindrical) extension 12. In this way, the longitudinal flange 11 is able to be inserted in the extension 12 with peripheral contact between the faces 19 and 20. When the longitudinal flange 11 is inserted in the extension 12, these two elements form the protruding tab 10A. The protruding tab 10A thus corresponds to a (cylindrical) tubular extension, which may be welded at the protruding end 8 as mentioned below.

Furthermore, as is shown in FIG. 2, the central portion 3 comprises a shoulder 18 on its inner face 19. Moreover, the lateral face 22 of the open end 6 of the dome 5 is configured to bear against a lateral face 21 of said shoulder 18 when the central portion 3 and the dome 5 are joined together. The shoulder 18 makes it possible to provide a bearing face (specifically the lateral face 21) for the dome 5, thereby making it easier to assemble the dome 5 on the central portion 3 and hold it in position thereon.

Furthermore, in a second embodiment, shown in two different implementations in each of FIGS. 3 and 4, the connecting element 7 corresponds to a flange 14, 16 arranged on an outer face 28 of the central portion 3, and the connecting element 9 corresponds to a flange 15, 17 arranged on the outer face 27 of the dome 5.

Moreover, the flange 14, 16 and the flange 15, 17 have cooperating shapes such that one face 23, 25 of the flange 14, 16 is able to bear against an associated face 24, 26 of the flange 15, 17. The flange 14, 16 and the flange 15, 17, thus connected by way of the contact between these associated faces, form the protruding tab 10B, 10C.

In the embodiment of FIG. 3, the flange 14 and the flange 15 correspond to rectilinear flanges, extending radially with respect to the axis X-X toward the outside of the tank 2. The face 23 of the flange 14 and the face 24 of the flange 15 are configured to bear against one another.

In this embodiment, at its open end 6 the dome 5 has a cylindrical extension 31 extending longitudinally toward the outside of said dome 5 along the axis X-X. Moreover, the connecting element 7 of the central portion 3 has at its free end 4 a cylindrical inner face 32 and the cylindrical extension 31 has a cylindrical outer face 30. The cylindrical extension 31 and the connecting element 7 have cooperating shapes such that said cylindrical extension 31 may be inserted in the central portion 3 with peripheral contact between the faces 30 and 32. The cylindrical extension 31 makes it possible to facilitate the positioning and holding of the dome 5 on the central portion 3 when they are joined together.

Moreover, at its free end 4, the central portion 3 has a truncation 33 at the angle formed by the faces 32 and 23. This truncation 33 may correspond, for example, to a chamfer made in the usual way, and makes it possible to facilitate the insertion of the dome 5 into the central portion 3.

Furthermore, at its free end 4, the central portion 3 has a thickened wall segment 29, located at the longitudinal part of said central portion 3 at the base of the flange 14. This wall segment 29 corresponds to a longitudinal cylindrical part of the central portion 3 which is thicker than the rest of said central portion 3. In particular, the objective of the wall segment 29 is to stiffen the central portion 3 at the base of the flange 14.

In a variant embodiment (not shown), the protruding tab may be rectilinear, but instead of extending radially with respect to the longitudinal axis X-X, therefore orthogonally to the longitudinal axis X-X, it may extend in a direction with an angle other than 90° in relation to this longitudinal axis X-X.

In another particular embodiment of the second embodiment, shown in FIG. 4, the protruding tab 10C, formed by the flange 16 and the flange 17, has a bent shape. The flanges 16 and 17 both have a bent shape, these shapes cooperating such that the face 25 of the flange 16 and the face 26 of the flange 17 are able to bear against one another. The flanges 16 and 17 thus joined form said protruding tab 10C.

In the example of FIG. 4, the bend formed by the protruding tab 10C has an angle substantially equal to 90°. In this case, a first segment of the protruding tab 10C is perpendicular to the longitudinal axis X-X of the tank 2 and a second segment of the protruding tab 10C is parallel to said longitudinal axis X-X.

Moreover, the flange 17 has a truncation 34 at the angle, formed by the two segments, of the bend. This truncation 34 is located on the exterior part of said bend and may in particular correspond to a chamfer made in the usual way.

The truncation 34 makes it possible to facilitate the insertion of the flange 17 in the flange 16 when the exterior faces of the bend formed by the flange 17 bear against the interior faces of the bend formed by the flange 16. In a variant embodiment (not shown), the protruding tab may have a bent shape comprising a bend with an angle other than 90°.

Within the scope of the present invention, the connecting elements 7 and 9 may be made in different ways. They are preferably made of the same material as the central portion 3 and the dome 5.

In a first particular embodiment, the connecting element 7 is directly part of the piece forming the central body 3 and is therefore incorporated in the central body 3. Similarly, the connecting element 9 is directly part of the piece forming the dome 5 and is therefore incorporated in the dome 5.

Moreover, in a second particular embodiment, these connecting elements 7 and 9 are individual fitted pieces. In this case, the connecting elements 7 and 9 are each fixed, preferably welded, on the central portion 3 and on the dome 5.

It is also conceivable that one of the connecting elements 7 and 9 is an integral element and the other one is a fitted element.

The connecting elements 7 and 9 are welded together at the protruding end 8 in such a way as to form the weld joint of the protruding tab 10A, 10B, 10C.

This weld joint is made using a weld bead 13, shown schematically by a thick line in FIGS. 2 to 4. This weld bead 13 is formed at the protruding end 8 of the protruding tab 10A, 10B, 10C at the interface (that is to say the respective faces in contact) between the connecting elements 7 and 9 and represents the part originating from the fusion of the welded parts (or of a filler metal). Within the scope of the present invention, a depth P of the weld bead 13 is understood to mean the maximum distance of the fused part extending toward the inside of the material in the direction perpendicular to the interface.

The weld joint of the protruding tab 10A, 10B, 10C may be made by usual welding processes, such as MIG/MAG ("Metal Inert Gas" and "Metal Active Gas") welding, TIG ("Tungsten Inert Gas") welding, or FSW ("Friction Stir Welding").

This welding is preferably done by friction stir welding, which is a process particularly suitable for aluminum, since aluminum is a material that is difficult to weld.

Furthermore, in a preferred embodiment, the protruding tab 10A, 10B, 10C has a length L which is greater than or equal to twice the (maximum) depth P of the weld bead 13.

The protruding tab 10A, 10B, 10C thus has a length L long enough to allow the tank 2 to be reopened multiple times.

This is because it is possible to cut out a part of the end of the protruding tab 10 that has the weld bead 13, as mentioned below, in order to eliminate the connection keeping the central portion 3 and the dome 5 joined together. Therefore, the central portion 3 and the dome 5 can be disassembled, and the tank 2 can be open, thereby making it possible to access the inside of said tank 2. In addition, the protruding tab 10A, 10B, 10C is cut out entirely on the outside of the tank 2, thereby avoiding contamination of the inside of the tank 2, in particular with chips ejected during this cutting out operation. Moreover, the tank 2 can then be joined together again. This is because, to open the tank 2, all that is required is to cut out the end of the protruding tab 10A, 10B, 10C over a length substantially equal to the depth P of the weld bead 13. As a matter of fact, the protruding tab 10A, 10B, 10C has a length at least twice as long as the depth P. Consequently, after the tank 2 has been opened, there is enough length left at the protruding tab 10A, 10B, 10C to be rewelded via a weld bead 13.

In a preferred embodiment, the protruding tab 10A, 10B, 10C has a length L which is less than or equal to ten times the depth P of the weld bead 13, such that it is not (unnecessarily) too long and that the bulk on the outside of the tank 2 is not increased.

The protruding tab 10 preferably has a total length L of between three and five times the (maximum) depth P of the weld bead 13. This multiple corresponds to an estimated mean number of necessary openings of the tank 2 throughout its service life and makes it possible to limit the size of the protruding tab 10A, 10B, 10C.

In this way, the tank 2 may be opened multiple times throughout its service life and cleanly, without damaging the inside of the tank 2. In addition, the total length of the tank is not reduced after each opening of said tank 2, since the cutting out is done not on the very body of the tank but on the protruding tab 10A, 10B, 10C. This makes it possible in particular to access the systems S located inside the tank 2, for example to carry out maintenance or repair operations.

In a particular embodiment, the tank 2 has two domes 5A, 5B each of which is fixed, in the way described above, to one of the two free ends of the central portion, as is shown in FIG. 1. The tank 2 may thus be closed at its two free ends, thereby making it possible to allow a tank 2 with a completely hermetically closed casing to be obtained.

A method for manufacturing the tank 2 is described below. In the following text, this manufacturing method is described for a preferred application, specifically for a tank 2 having two domes 5A and 5B. However, this method may apply similarly to a tank 2 having a single dome 5.

Figure 6:
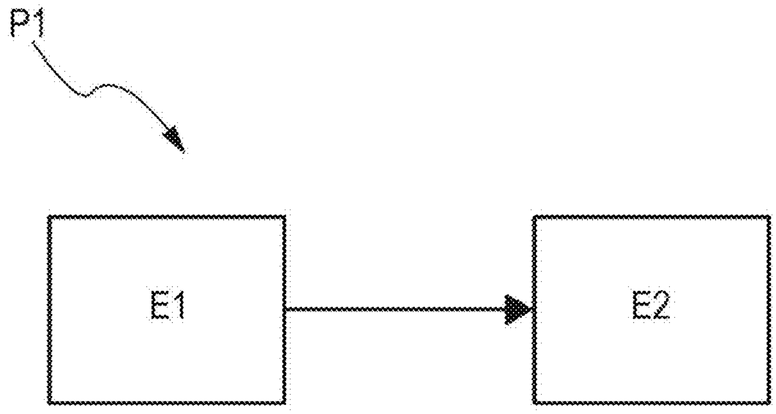
FIG. 6 schematically shows the steps of a method for manufacturing a tank.

As is shown schematically in FIG. 6, this manufacturing method P1 has the following successive steps:

a joining step E1; and a welding step E2.

The manufacturing step E1 consists in positioning the open ends 6 of the two domes 5 on the free ends 4 of the central portion 3 such that the connecting elements 7 and 9 form a protruding tab 10A, 10B, 10C at each of the two ends of the tank 2. In addition, it consists in keeping the central portion 3 and the two domes 5 in position from the outside of the tank 2, by using a suitable tool allowing the assembly to be kept stable so as to be able to weld the two protruding tabs 10A, 10B, 10C.

The welding step E2 consists in welding the connecting elements 7 and 9 (forming the protruding tabs 10A, 10B, 10C) to one another, at the protruding ends 8, so as to form a weld bead 13 each time. As indicated above, this weld bead 13 corresponds to the single fixed connection between the connecting elements 7 and 9 and the single fixed connection of the corresponding dome 5 on the central portion 3.

During its use, it may become necessary to open the tank 2, in particular to carry out operations inside said tank 2, for example maintenance or repair operations on one or more of the various systems S. In such a situation, the tank 2 is opened at least at one of its ends, and then joined back together again once these operations are finished.

A method for maintaining the tank 2 that makes it possible to carry out such maintenance or repair operations is described below.

Figure 7:
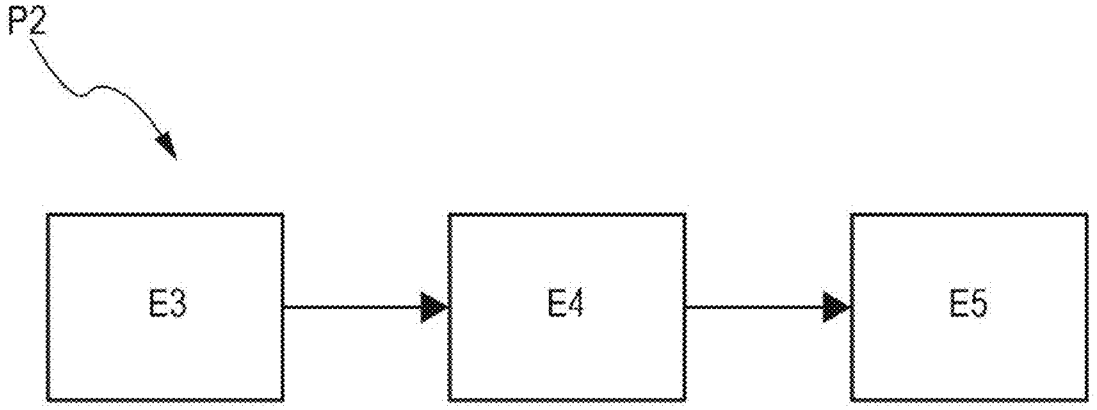
FIG. 7 schematically shows the steps of a method for maintaining a tank.

As is shown schematically in FIG. 7, this maintenance method P2 has the following successive steps, illustrated in FIGS. 5A to 5D:

- a cutting-out step E3;
- a removing step E4; and
- a remounting step E5. The cutting-out step E3 and the removing step E4 correspond to the steps for opening the tank 2 at one of the free ends 4, as is shown schematically in FIGS. 5A, 5B and 5C.

Figure 5B:
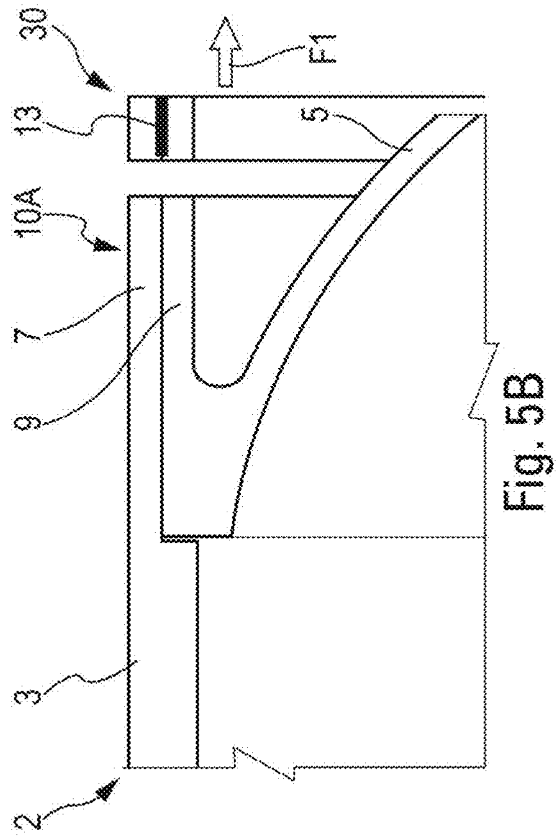
FIG. 5B is a view similar to that of FIG. 5A when the tank is being opened after the welded part of the protruding tab has been cut out.
Figure 5D:
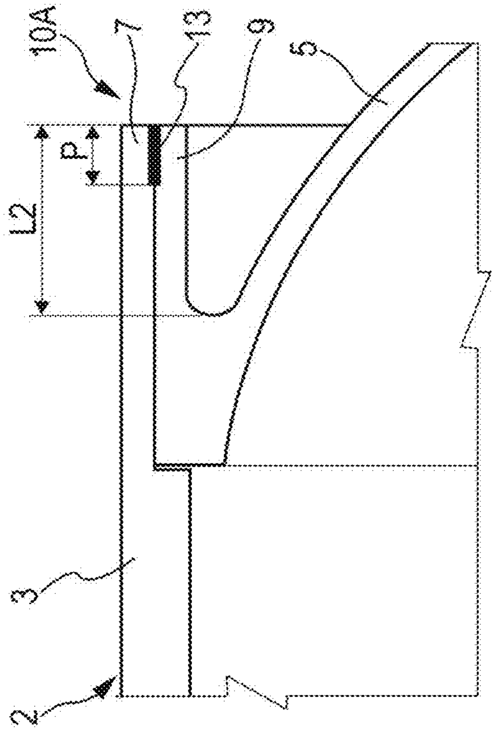
FIG. 5D is a view similar to that of FIG. 5C, after the central portion and the dome have been joined together again and the protruding tab has been welded afresh.
Figure 5A:
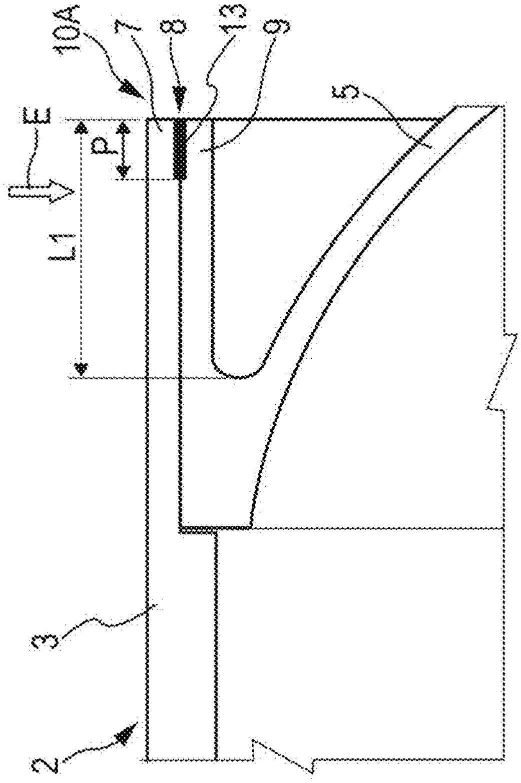
FIG. 5A is a partial view, in section, similar to that of FIG. 2, of an interface region between a central portion and a dome of a tank provided with a welded protruding tab.

The cutting-out step E3 consists in cutting out at least the welded protruding end 8 of the protruding tab 10A that has a length L1, using a conventional cutting-out tool, as is shown by an arrow E in FIG. 5A. Such a cutting-out operation makes it possible to separate a part 30 (an end part of the protruding tab 10A provided with the weld bead 13) from the rest of the protruding tab 10A.

Once the cutting out is done, it is possible to separate this cut-out part 30 from the tank 2, as is illustrated by an arrow F1 in FIG. 5B, the single fixed connection between the dome 5 and the central body 3 thus being eliminated.

Figure 5C:
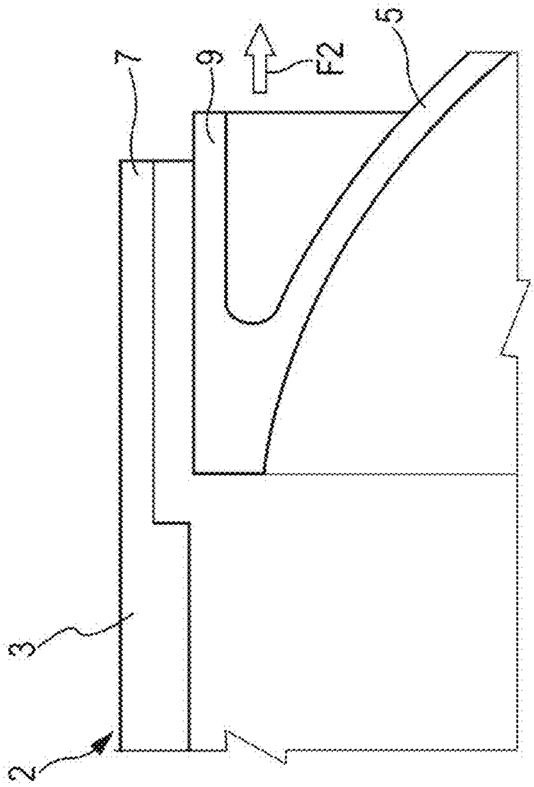
FIG. 5C is a view similar to that of FIG. 5B when the tank is being opened after the central portion and the dome have been disassembled.

The removing step E4 consists in removing the dome 5 (which is no longer fixed there) from the central body 3, as is illustrated by an arrow F2 in FIG. 5C.

When the dome 5 has been completely withdrawn from the central body 3, it is possible to access the inside of the tank 2 to carry out the required operations there.

Once these operations have been carried out, the tank 2 may be joined back together by rewelding the dome 5 to the central portion 3.

The remounting step E5 consists in repositioning the dome 5 on the central portion 3 so as to reform the protruding tab 10A, 10B, 10C. This protruding tab 10A, 10B, 10C thus reformed has a reduced length L2 corresponding to its initial length L1 minus the length of said part 30.

More specifically, the length L2 is substantially equal to the length L1, minus a distance which is slightly greater than the depth P. To be sure of removing all of the weld bead 13 during the cutting-out operation, the part 30 specifically has a length which is slightly greater than the depth P of the weld bead 13.

The remounting step E5 then consists in welding the dome 5 and the central portion 3 to one another at the protruding end 8 of said protruding tab 10A, 10B, 10C by forming the weld bead 13, as illustrated in FIG. 5D. This weld bead 13 has in particular a depth P which is less than the length L2 of the protruding tab 10A, 10B, 10C. This will make it possible, if required and if the length L2 is long enough, to subsequently implement the method P2 again.

As concerns joining the tank 2 back together, it may be necessary to correct the surfaces that have been degraded during the cutting out of the protruding tab 10A. This correction makes it possible to obtain a new surface for the protruding end 8 intended to be welded, in particular a clean and weldable surface.

The tank 2 thus joined back together can be reused, in the usual way, in the context of the application under consideration.

The tank 2 as described above thus has numerous advantages.

In particular, what is obtained is a tank 2 provided with a part intended to be welded, specifically the protruding tab 10A, 10B, 10C, which is located on the outside of said tank 2. Consequently, the protruding tab 10A, 10B, 10C is accessible from the outside of the tank 2, thereby making it possible to manufacture the tank 2 without having to perform actions inside it.

This is because, for the one part, the protruding tab 10A, 10B, 10C has surfaces which can be used for holding the central portion 3 and the dome 5 in position when they are being joined together. For the other part, the protruding end 8 of the protruding tab 10A, 10B, 10C can be accessed easily, thereby allowing a welding process to be readily implemented. In addition, once the manufacturing operations are finished, the tools can be withdrawn without constraint since they are positioned exclusively on the outside of the tank 2.

Furthermore, the protruding tab 10A, 10B, 10C has a length L such that it is possible to open the tank 2 by performing actions solely on said protruding tab 10A, 10B, 10C. This is because, by cutting out the welded protruding end 8, it is possible to easily separate the central portion 3 and the dome 5. The tank 2 can thus be opened without risking contamination of the interior with, for example, cut chips.

Moreover, since the protruding tab 10A, 10B, 10C is not cut out entirely during an opening operation, it is possible to weld the central portion 3 and the dome 5 together again, by using the remaining length of the protruding tab 10A, 10B, 10C. The tank 2 can thus be opened and then joined back together multiple times by reducing the length of the protruding tab 10A, 10B, 10C and not the total length of said tank 2.

The tank 2 as described above is intended to be incorporated in a reservoir 1 for liquid hydrogen. In a preferred embodiment, shown in FIG. 1, the reservoir 1 has two tanks 2 of this type, corresponding respectively to the outer tank (identified by the reference 2A) and the inner tank (identified by the reference 2B). The inner tank 2B is arranged inside the outer tank 2A. In this preferred embodiment, the outer tank 2A may in particular be used as protective and insulating enclosure, whereas the inner tank 2B may in particular be used as container for the liquid hydrogen. The reservoir 1 also has the assembly of systems S.

The invention claimed is:

1. A method for maintaining a tank, said tank comprising: at least one central portion having at least one end referred to as free end and at least one dome having an end referred to as open end, said dome and said central portion joined together by arranging the open end of said dome on the free end of the central portion, the free end of the central portion comprising a first connecting element, the open end of the dome comprising, on an outer face of the dome, a second connecting element, and said first connecting element and said second connecting element configured to form, when the central portion and the dome are joined together, a protruding tab extending toward the outside of the tank and welded at a protruding end by a weld bead, wherein the protruding tab has a total length (L) which is greater than or equal to twice a depth (P) of the weld bead, wherein the method comprising:

- a cutting-out step, including cutting out a part of a protruding tab having an initial length (L1), said cut-out part corresponding at least to a welded protruding end of said protruding tab having a weld bead, and said cut-out part having a length which is greater than a depth (P) of said weld bead; and
- a removing step, including opening the tank having at least one dome and a central portion by separating at least said dome from said central portion, which are no longer fixed to one another, allowing access to the tank in order to carry out maintenance operations.

2. The method as claimed in claim 1, further comprising:
a remounting step including repositioning the dome on the central portion so as to reform the protruding tab, said protruding tab having a reduced length (L2) corresponding to its initial length (L1) minus the length of said cut-out part.

3. The method as claimed in claim 2, wherein the remounting step comprises welding the dome and the central portion to one another at the protruding end of said protruding tab by forming a second weld bead having a second depth (P) which is less than the reduced length (L2) of the protruding tab.

4. The method as claimed in claim 1, wherein the cutting-out step comprises leaving a sufficient length of the protruding tab uncut to carry out a new welding operation.

5. The method as claimed in claim 4, wherein the cutting-out step comprises leaving a sufficient length of protruding tab uncut to allow multiple successive mounting and dismounting operations.

6. The method as claimed in claim 1, wherein the protruding tab has the initial length (L1) less than or equal to ten times the depth (P) of said weld bead.

* * * * *